(12) United States Patent
Won et al.

(10) Patent No.: US 10,249,895 B2
(45) Date of Patent: Apr. 2, 2019

(54) APPARATUS AND METHOD FOR DIAGNOSING STATE OF FUEL CELL STACK

(71) Applicant: Hyundai Motor Company, Seoul (KR)

(72) Inventors: Sang Bok Won, Seoul (KR); Young Bum Kum, Seoul (KR); Kwi Seong Jeong, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 108 days.

(21) Appl. No.: 15/373,286

(22) Filed: Dec. 8, 2016

(65) Prior Publication Data
US 2018/0108925 A1 Apr. 19, 2018

(30) Foreign Application Priority Data
Oct. 18, 2016 (KR) .................. 10-2016-0135286

(51) Int. Cl.
*H01M 8/04* (2016.01)
*H01M 8/24* (2016.01)
*H01M 8/10* (2016.01)
*H01M 8/04537* (2016.01)
*H01M 8/2457* (2016.01)
(Continued)

(52) U.S. Cl.
CPC ... *H01M 8/04649* (2013.01); *H01M 8/04007* (2013.01); *H01M 8/0485* (2013.01); *H01M 8/04225* (2016.02); *H01M 8/04253* (2013.01); *H01M 8/04291* (2013.01); *H01M 8/04302* (2016.02); *H01M 8/04731* (2013.01); *H01M 8/1004* (2013.01); *H01M 8/1007* (2016.02); *H01M 8/241* (2013.01); *H01M 8/2457* (2016.02); *B60L 11/1883* (2013.01); *H01M 2008/1095* (2013.01); *H01M 2250/20* (2013.01); *H01M 2300/0082* (2013.01);
(Continued)

(58) Field of Classification Search
CPC ........ H01M 8/04649; H01M 8/04225; H01M 8/2457; H01M 8/241; H01M 8/1004; H01M 8/0485; H01M 8/04731; H01M 8/04291; H01M 8/04253; H01M 8/04007; H01M 8/1007; H01M 8/04302; B60L 11/1883
See application file for complete search history.

(56) References Cited

U.S. PATENT DOCUMENTS

| | | | |
|---|---|---|---|
| 8,658,322 B2 | 2/2014 | Kitamura | |
| 8,889,309 B2 | 11/2014 | Manabe et al. | |
| 9,105,889 B2 | 8/2015 | Suematsu et al. | |
| 9,373,860 B2 | 6/2016 | Jeong et al. | |
| 2005/0287402 A1* | 12/2005 | Maly | H01M 8/04291 702/65 |
| 2007/0259256 A1* | 11/2007 | Le Canut | H01M 8/04089 429/90 |
| 2011/0027679 A1 | 2/2011 | Nonobe | |

(Continued)

FOREIGN PATENT DOCUMENTS

| | | | |
|---|---|---|---|
| JP | 2008130445 A | 6/2008 | |
| JP | 2009301791 A | 12/2009 | |

(Continued)

*Primary Examiner* — Anthony R Jimenez
*Assistant Examiner* — Paul D Baillargeon
(74) *Attorney, Agent, or Firm* — Slater Matsil, LLP

(57) ABSTRACT

An apparatus includes a stack voltage monitor that measures a voltage of each channel of a plurality of channels of a fuel cell stack. Each of the channel of the plurality of channels includes a predetermined number of unit cells. The stack voltage monitor calculates impedance of each of the channel from the measured voltage. The apparatus further includes a (Continued)

controller that diagnoses a state of the fuel cell stack based on the impedance of each of the channel.

18 Claims, 6 Drawing Sheets

(51) Int. Cl.
| | |
|---|---|
| *H01M 8/04225* | (2016.01) |
| *H01M 8/04302* | (2016.01) |
| *H01M 8/1007* | (2016.01) |
| *H01M 8/04007* | (2016.01) |
| *H01M 8/04223* | (2016.01) |
| *H01M 8/04291* | (2016.01) |
| *H01M 8/04701* | (2016.01) |
| *H01M 8/04828* | (2016.01) |
| *H01M 8/1004* | (2016.01) |
| *H01M 8/241* | (2016.01) |
| *B60L 11/18* | (2006.01) |
| *H01M 8/1018* | (2016.01) |

(52) U.S. Cl.
CPC ............. *Y02E 60/521* (2013.01); *Y02T 90/32* (2013.01); *Y02T 90/34* (2013.01)

(56) References Cited

U.S. PATENT DOCUMENTS

| | | | |
|---|---|---|---|
| 2014/0372053 A1* | 12/2014 | Lin | .................... G01R 31/3648 |
| | | | 702/63 |
| 2016/0149240 A1 | 5/2016 | Won et al. | |
| 2017/0324106 A1* | 11/2017 | Sinha | ................ H01M 8/04291 |

FOREIGN PATENT DOCUMENTS

| | | | |
|---|---|---|---|
| JP | 2012252986 A | 12/2012 | |
| JP | 5327557 B2 | 10/2013 | |
| KR | 101416400 B1 | 8/2014 | |
| KR | 20160072874 A | 6/2016 | |
| KR | 101637746 B1 | 7/2016 | |
| WO | WO-2016146971 A1 * | 9/2016 | ........ H01M 8/04552 |

* cited by examiner

APPARATUS AND METHOD FOR DIAGNOSING STATE OF FUEL CELL STACK

CROSS-REFERENCE TO RELATED APPLICATIONS

This application is based on and claims the benefit of priority to Korean Patent Application No. 10-2016-0135286, filed on Oct. 18, 2016 in the Korean Intellectual Property Office, the disclosure of which is incorporated herein in its entirety by reference.

TECHNICAL FIELD

The present disclosure relates to an apparatus and a method for diagnosing a state of a fuel cell stack, and more particularly, to a technology for constituting channels including a predetermined number of cells with respect to cells constituting a fuel cell stack, measuring voltages of each channel, calculating impedances of channels having specific voltages, and then diagnosing a state of the fuel cell stack on the basis of the calculated impedances.

BACKGROUND

Fuel cells are a kind of power generation apparatus that does not convert chemical energy of a fuel into heat by combustion, but converts the chemical energy into electric energy by an electrochemical reaction in a stack, and may be used to supply to power to small electric/electronic products, particularly, portable apparatuses, as well as supply industrial power, domestic power, and power for driving a vehicle.

A polymer electrolyte membrane fuel cell (or a proton exchange membrane fuel cell) (PEMFC) having the highest power density among the fuel cells has been currently studied mainly as a source supplying the power for driving the vehicle. The PEMFC has a rapid start-up time and a rapid power conversion reaction time due to a low operation temperature.

The PEMFC is configured to include a membrane-electrode assembly (MEA) in which catalyst electrode layers in which an electrochemical reaction occurs are attached onto both sides of a solid polymer electrolyte membrane in which protons move, gas diffusion layers (GDLs) serving to uniformly diffuse reaction gases and transfer generated electric energy, gaskets and fastening mechanisms maintaining airtightness and appropriate fastening pressures of the reaction gases and a coolant, and bipolar plates moving the reaction gases and the coolant.

When a fuel cell stack is assembled using the configuration of the unit cell described above, a combination of the membrane-electrode assembly and the gas diffusion layer, which is a main component, is positioned at the innermost side of the cell. The membrane-electrode assembly has the catalyst electrode layers, that is, an anode and a cathode, formed on both surfaces of the solid polymer electrolyte membrane and having catalysts applied so that hydrogen and oxygen may react each other, and the gas diffusion layers, the gaskets, and the like, are stacked onto outer surfaces of the anode and the cathode.

The bipolar plates supplying the reaction gases (hydrogen corresponding to a fuel and oxygen or air corresponding to an oxidizing agent) and having flow fields through which the coolant passes are formed outside the gas diffusion layers.

After a plurality of unit cells having the configuration described above are stacked, current collectors, insulating plates, and end plates for supporting the stacked cells are coupled to the outermost side, and the unit cells are repeatedly stacked and fastened to one another between the end plates to constitute the fuel cell stack.

In order to obtain a potential required in an actual vehicle, the unit cells should be stacked by the required potential, and the stack is formed by stacking the unit cells. A potential generated in one unit cell is about 1.3V, and a plurality of cells are stacked in series with one another in order to generate power required for driving the vehicle.

Therefore, when performance deterioration or a fault occurs in any one of the unit cells constituting the fuel cell stack, entire performance of the fuel cell stack is deteriorated, such that a stable operation is not provided.

In a technology for diagnosing a state of a fuel cell stack according to the related art, the state of the fuel cell stack is diagnosed using only an impedance of the fuel cell stack rather than impedances of each channel including a predetermined number of cells, and it may not be thus detected whether or not abnormity is generated in a channel unit.

Particularly, in the technology for diagnosing a state of a fuel cell stack according to the related art, a cell into which foreign materials are introduced, a frozen cell, a cell having an insufficient humidity amount, a cell having an excessive humidity amount, and the like, may not be detected, and a mixed state in which a cell having an insufficient humidity amount and a cell having an excessive humidity amount coexist with each other may not be diagnosed.

SUMMARY

The present disclosure has been made to solve the above-mentioned problems occurring in the prior art while advantages achieved by the prior art are maintained intact.

An aspect of the present disclosure provides an apparatus and a method for diagnosing a state of a fuel cell stack capable of detecting whether or not abnormity is generated in a channel unit by constituting channels including a predetermined number of cells with respect to cells constituting the fuel cell stack, measuring voltages of each channel, calculating impedances of channels having specific voltages, and then diagnosing the state of the fuel cell stack on the basis of the calculated impedances.

Particularly, an aspect of the present disclosure provides an apparatus and a method for diagnosing a state of a fuel cell stack capable of detecting a cell into which foreign materials are introduced, a frozen cell, a cell having an insufficient humidity amount, a cell having an excessive humidity amount, and the like, and diagnosing a mixed state in which a cell having an insufficient humidity amount and a cell having an excessive humidity amount coexist with each other by constituting channels including a predetermined number of cells with respect to cells constituting the fuel cell stack, measuring voltages of each channel, calculating impedances of channels having specific voltages, and then diagnosing the state of the fuel cell stack on the basis of the calculated impedances.

Objects of the present disclosure are not limited to the above-mentioned object, and other objects and advantages of the present disclosure that are not mentioned may be understood by the following description and will be more clearly appreciated by exemplary embodiments of the present disclosure. In addition, it may be easily appreciated that objects and advantages of the present disclosure may be realized by means mentioned in the claims and a combination thereof.

According to an exemplary embodiment of the present disclosure, an apparatus for diagnosing a state of a fuel cell stack includes: a stack voltage monitor (SVM) constituting channels including a predetermined number of cells with respect to cells constituting the fuel cell stack, measuring voltages of each channel, and then calculating impedances of channels having specific voltages; and a controller diagnosing the state of the fuel cell stack on the basis of the impedances of each channel calculated by the SVM.

According to another exemplary embodiment of the present disclosure, a method for diagnosing a state of a fuel cell stack includes: constituting channels including a predetermined number of cells with respect to cells constituting the fuel cell stack, measuring voltages of each channel, and then calculating impedances of channels having specific voltages by an SVM; and diagnosing the state of the fuel cell stack on the basis of the calculated impedances of each channel by a controller.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

The above-mentioned objects, features, and advantages will become more obvious from the following description described below in detail with reference to the accompanying drawings. Therefore, those skilled in the art to which the present disclosure pertains may easily practice a technical idea of the present disclosure. Further, in describing the present disclosure, in the case in which it is decided that a detailed description of a well-known technology associated with the present disclosure may unnecessarily make the gist of the present disclosure unclear, it will be omitted. Hereinafter, exemplary embodiments of the present disclosure will be described in detail with reference to the accompanying drawings.

Figure 1:
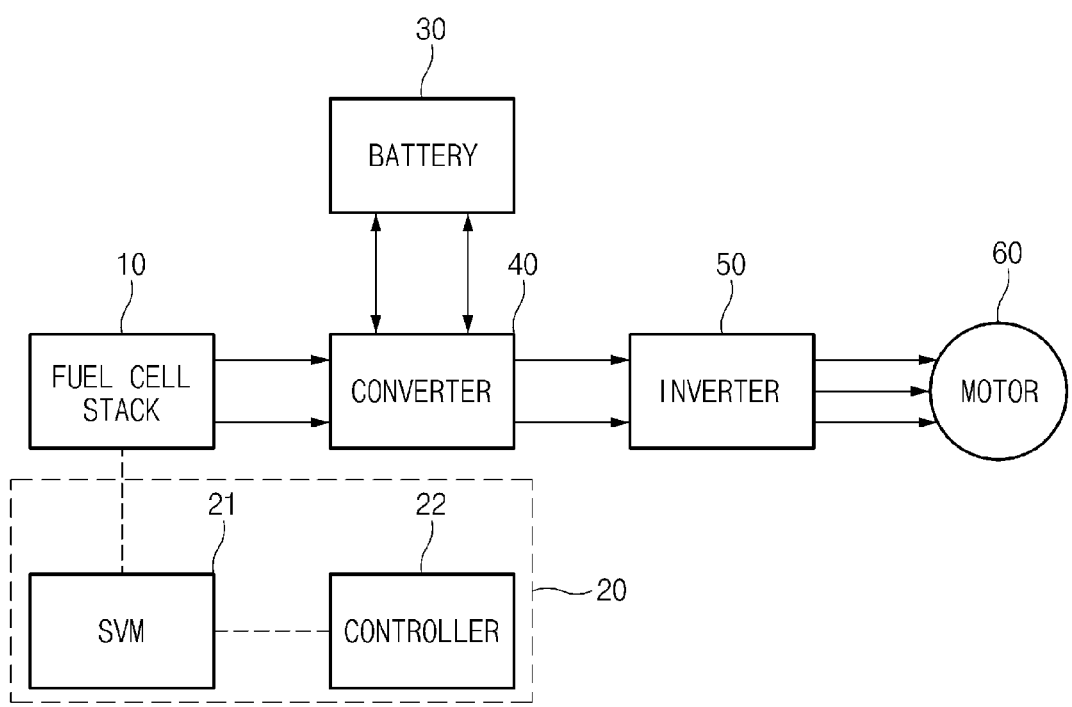
FIG. 1 is a block diagram illustrating a system for driving a fuel cell electric vehicle (FCEV) according to an exemplary embodiment of the present disclosure.

FIG. 1 is a block diagram illustrating a system for driving a fuel cell electric vehicle (FCEV) according to an exemplary embodiment of the present disclosure.

As illustrated in FIG. 1, the system for driving a fuel cell electric vehicle (FCEV) according to an exemplary embodiment of the present disclosure includes a fuel cell stack 10, an apparatus 20 for diagnosing a state of a fuel cell stack, a battery 30, a converter 40, an inverter 50, and a motor 60.

Here, the fuel cell stack 10 includes several hundreds of cells, and provides power for driving the fuel cell electric vehicle.

Particularly, the fuel cell stack 10 is electrically connected to the converter 40 and the inverter 50, such that an alternating current (AC) component is generated in an output of the fuel cell stack 10 due to a switching operation of the converter 40 and a switching operation of the inverter 50. That is, the AC component is generated in the output of the fuel cell stack 10 due to a change in an output voltage of the converter 40 and a change in an output voltage of the inverter 50.

Therefore, the apparatus 20 for diagnosing a state of a fuel cell stack according to an exemplary embodiment of the present disclosure may measure impedances of each channel of the fuel cell stack 10.

The apparatus 20 for diagnosing a state of a fuel cell stack constitutes channels including a predetermined number of unit cells with respect to unit cells constituting the fuel cell stack 10, measures voltages of each channel, selects channels using the measured voltages, calculates impedances of the selected channels, and then diagnoses the fuel cell stack 10 on the basis of the calculated impedances. Here, a process of selecting the channels will be described in detail below.

The battery 30, which is a 12V auxiliary battery, serves to supply power to electric loads of the fuel cell electric vehicle.

The converter 40 steps down a voltage (200V to 400V) of the fuel cell stack 10 into a low voltage (12V to 14V) that may be used in 12V electric loads (a lamp, an actuator, an audio, and the like) of the fuel cell electric vehicle.

The converter 40 controls a primary-side semiconductor switch (a metal oxide semiconductor field effect transistor (MOSFET)) to convert a DC voltage (Vin) of the fuel cell stack 12 into an alternating current (AC) voltage, steps down the converted AC voltage into a low AC voltage (12V to 14V) using a transformer (Tr), rectifies the low AC voltage to be a DC voltage through a secondary-side synchronizing rectifier (a MOSFET), passes the rectified DC voltage through a filter (Lf-Cf), and then supplies a stable DC voltage $V_o$ to the electric loads of the fuel cell electric vehicle. The DC voltage $V_o$ may be used to charge the battery 30.

The inverter 50 converts the DC voltage output from the converter 40 into a rated AC voltage for driving the motor.

The motor 60, which is a device serving to move the fuel cell electric vehicle instead of an engine, is operated on the basis of the AC voltage from the inverter 50.

Hereinafter, the apparatus 20 for diagnosing a state of a fuel cell stack according to an exemplary embodiment of the present disclosure will be described in detail.

The apparatus 20 for diagnosing a state of a fuel cell stack according to an exemplary embodiment of the present disclosure includes a stack voltage monitor (SVM) 21 and a controller 22.

The respective components described above will be described. First, the SVM 21, which is a module including a processor and monitoring the fuel cell stack 10, constitutes channels including a predetermined number of (for example, one to ten) unit cells with respect to cells constituting the fuel cell stack 10.

As an example, in the case in which three unit cells constitutes one channel with respect to the fuel cell stack 10 including 600 cells, a total number of channels is 200. Here, in a channel of a start position of the fuel cell stack 10, which is a channel of a unique position used to figure out a distribution of impedances of each channel of the fuel cell stack 10, a problem such as a low temperature, depression by a manifold, or the like, may occur due to positional characteristics of the channel. In addition, in a channel of a central position of the fuel cell stack 10, which is a channel of a unique position used to figure out the distribution of the impedances of each channel of the fuel cell stack 10, a problem such as a high temperature, or the like, may occur due to positional characteristics of the channel. In addition, in a channel of a final position of the fuel cell stack 10, which is a channel of a unique position used to figure out the distribution of the impedances of each channel of the fuel cell stack 10, a problem such as a low temperature, depression by a manifold, or the like, may occur due to positional characteristics of the channel. In addition, a channel of a ¼ position and a channel of a ¾ position of the fuel cell stack 10 are channels of unique positions used to figure out the distribution of the impedances of each channel of the fuel cell stack 10.

Figure 2:
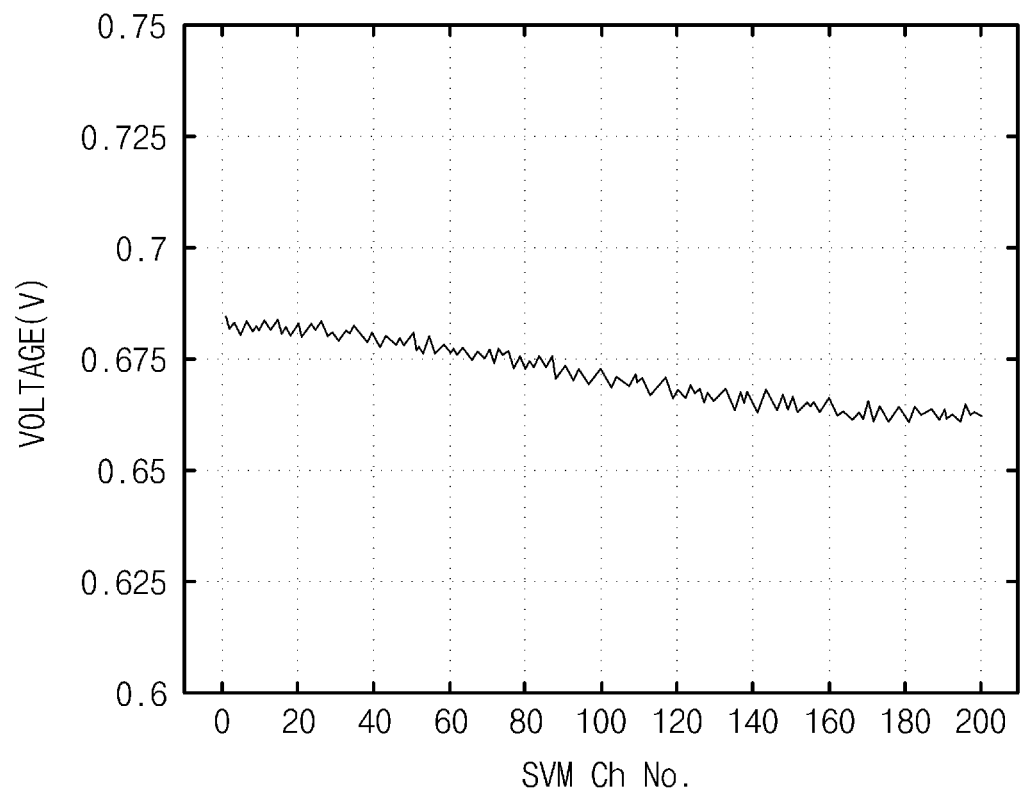
FIG. 2 is an illustrative view illustrating voltages measured for each channel by a stack voltage monitor (SVM) according to an exemplary embodiment of the present disclosure.

Voltages measured for each of the channels constituted as described above by the SVM 21 are illustrated in FIG. 2. In FIG. 2, a vertical axis indicates a voltage V, and a horizontal axis indicates a channel number Ch No.

Figure 3:
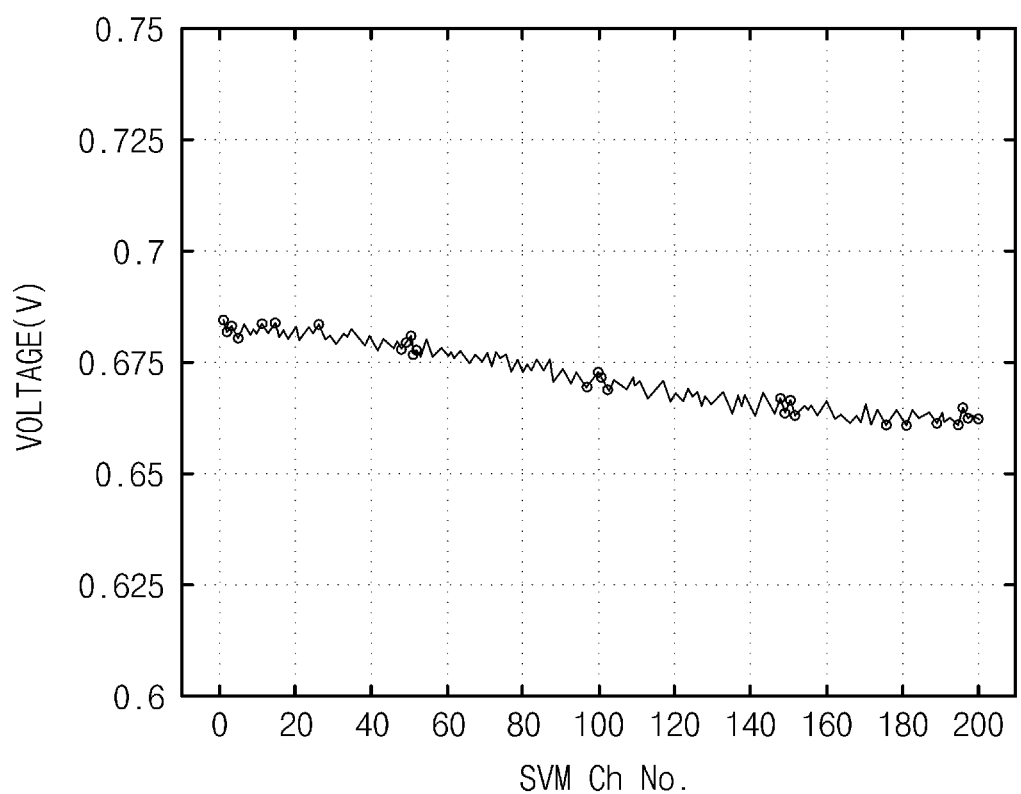
FIG. 3 is an illustrative view illustrating channels selected on the basis of voltages by the SVM according to an exemplary embodiment of the present disclosure.

Then, the SVM 21 selects channels having an influence on diagnosing the state of the fuel cell stack 10 on the basis of the voltages of each channel with respect to each channel, as illustrated in FIG. 3. That is, the SVM 21 selects a channel of which a voltage is minimum (hereinafter, referred to as a minimum voltage channel), a channel of which a voltage is maximum (hereinafter, referred to as a maximum voltage channel), a channel of which a voltage is an average voltage (hereinafter, referred to as an average voltage channel), a channel of which a voltage variation rate is maximum (hereinafter, referred to as a maximum voltage variation channel), and a channel of which a voltage variation rate is minimum (hereinafter, referred to as a minimum voltage variation channel) among all the channels. Here, the average voltage means an average voltage of all the channels (200 channels).

Since the minimum voltage channel selected as described above is the most vulnerable channel, it is required to analyze an impedance of the minimum voltage channel. Since the maximum voltage channel is the most robust channel, it is required to analyze an impedance of the maximum voltage channel, and the maximum voltage channel may be utilized as a comparison group. Since the average voltage channel is a channel in an average state, it is required to analyze an impedance of the average voltage channel, and the average voltage channel may be utilized as a comparison group. Since the maximum voltage variation channel has a large voltage variation, there is the possibility that the maximum voltage variation channel will be developed to a vulnerable cell, such that it is required to analyze an impedance of the maximum voltage variation channel. Since the minimum voltage variation channel is a channel in the most stable state, it is required to analyze an impedance of the minimum voltage variation channel, and the minimum voltage variation channel may be utilized as a comparison group.

In addition, in the case in which a plurality of minimum voltage channels are present, the SVM 21 selects any channel of the plurality of minimum voltage channels. In addition, in the case in which a plurality of maximum voltage channels are present, the SVM 21 selects any channel of the plurality of maximum voltage channels. In addition, in the case in which a plurality of average voltage channels are present, the SVM 21 selects any channel of the plurality of average voltage channels. In addition, in the case in which a plurality of maximum voltage variation channels are present, the SVM 21 selects any channel of the plurality of maximum voltage variation channels. In addition, in the case in which a plurality of minimum voltage variation channels are present, the SVM 21 selects any channel of the plurality of minimum voltage variation channels.

Figure 4:
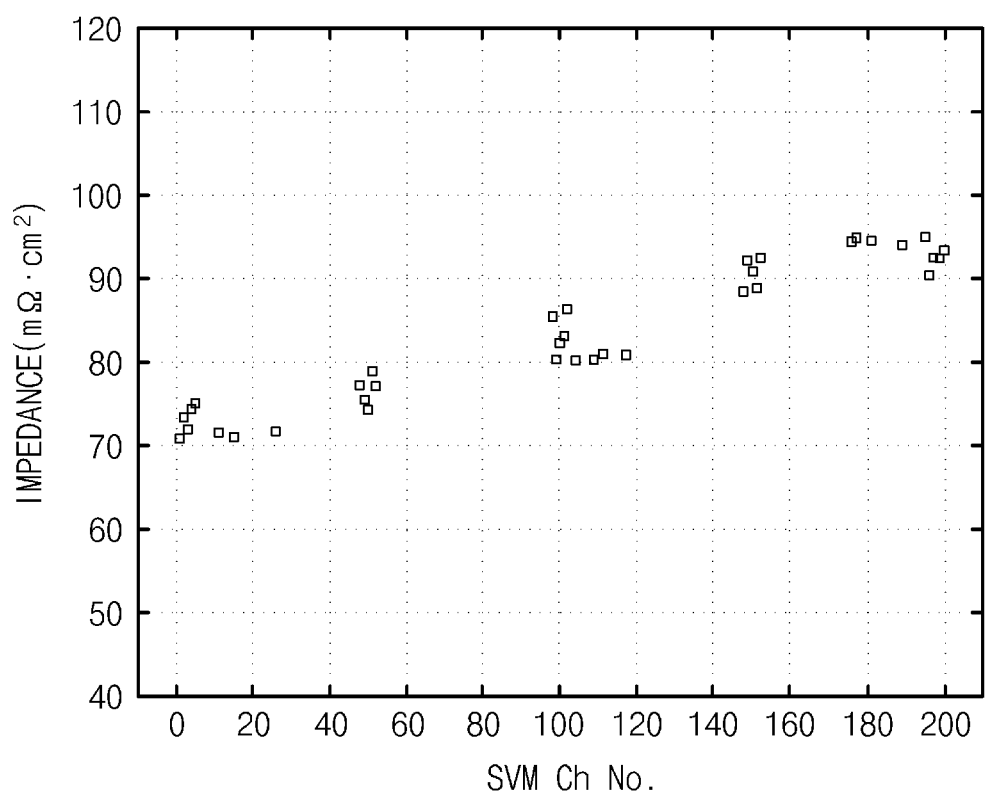
FIG. 4 is an illustrative view illustrating impedances measured for each selected channel by the SVM according to an exemplary embodiment of the present disclosure.

Then, the SVM 21 calculates impedances of the channels selected as described above. That is, the SVM 21 calculates an impedance of the minimum voltage channel, an impedance of the maximum voltage channel, an impedance of the average voltage channel, an impedance of the maximum voltage variation channel, and an impedance of the minimum voltage variation channel. The impedances of each channel calculated as described above are illustrated in FIG. 4. In FIG. 4, a vertical axis indicates an impedance, and a horizontal axis indicates a channel number Ch No. For reference, SVM 21 configured to apply AC current to a channel and measure an AC voltage of the channel and calculate an impedance of the channel based on the AC voltage and the AC current.

Figure 5:
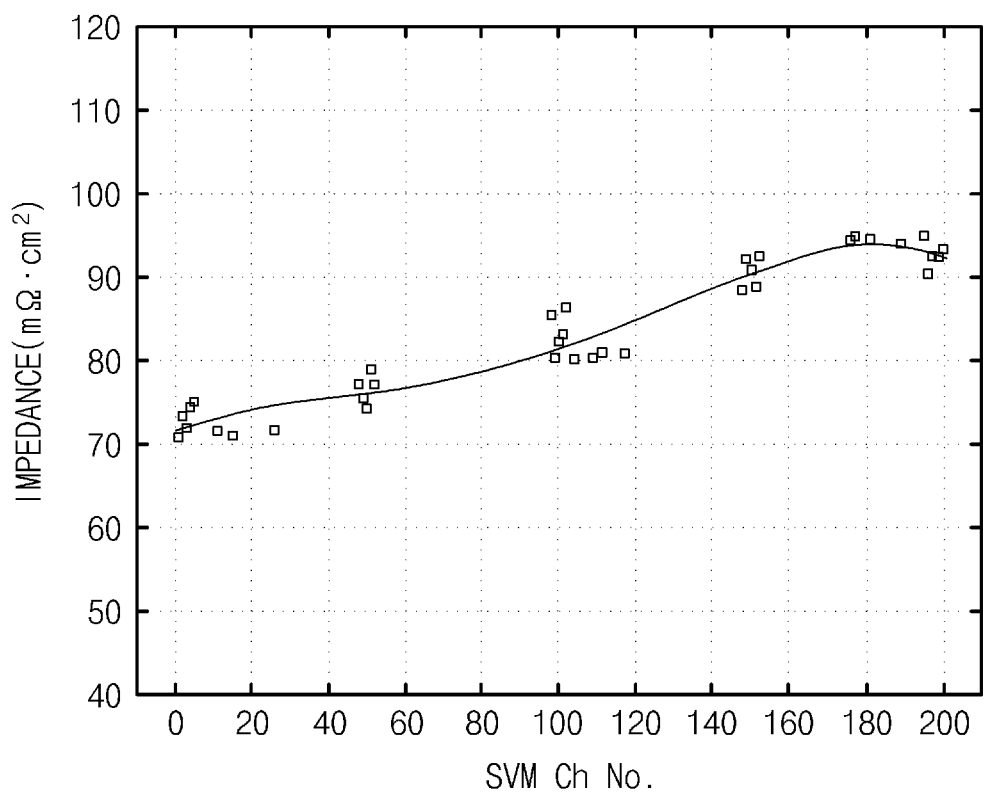
FIG. 5 is an illustrative view illustrating a distribution of impedances of all of the channels estimated by the SVM according to an exemplary embodiment of the present disclosure.

In addition, the SVM 21 may estimate a distribution of impedances of all the channels of the fuel cell stack 10 on the basis of the distribution of the impedances of each channel calculated as described above. Here, the SVM 21 may use a curve fitting method, or the like. The distribution of the impedances estimated as described above is illustrated in FIG. 5. In FIG. 5, a vertical axis indicates an impedance, and a horizontal axis indicates a channel number Ch No.

In addition, the SVM 21 may also calculate an impedance of the fuel cell stack 10 (hereinafter, referred to as a stack impedance). Here, the stack impedance, which is mentioned in the related art, means a calculated impedance of all the cells of the fuel cell stack 10 without dividing the fuel cell stack 10 into channels.

As a result, the SVM 21 constitutes the channels including a predetermined number of cells with respect to the cells constituting the fuel cell stack 10, measures the voltages of each channel, calculates the impedance of the minimum voltage channel, the impedance of the maximum voltage channel, the impedance of the average voltage channel, the impedance of the maximum voltage variation channel, the impedance of the minimum voltage variation channel, and the stack impedance, and estimates the distribution of the impedances of all the channels of the fuel cell stack 10.

As described above, the apparatus 20 for diagnosing a state of a fuel cell stack according to an exemplary embodiment of the present disclosure does not calculate impedances of all the channels (200 channels), but calculates impedances of only five channels having an influence on diagnosing the state of the fuel cell stack 10, thereby making it possible to significantly reduce a calculation amount. A function of the SVM 21 may also be implemented to be performed by the controller 22.

Next, the controller 22 may be implemented by a micro controller unit (MCU), and diagnoses the state of the fuel cell stack 10 on the basis of the impedance of the minimum voltage channel, the impedance of the maximum voltage channel, the impedance of the average voltage channel, the impedance of the maximum voltage variation channel, the impedance of the minimum voltage variation channel, the stack impedance, and the distribution of the impedances of all the channels of the fuel cell stack 10 provided from the SVM 21 and a driving condition (whether or not the driving condition is low-temperature start-up). Here, the controller 22 may confirm the driving condition (normal driving or the low-temperature start-up) through a temperature sensor (not illustrated) included in the fuel cell stack 10.

Hereinafter, a process of diagnosing the state of the fuel cell stack 10 by the controller 22 will be described. Here, the controller 22 decides that the state of the fuel cell stack 10 is a normal state except for the following cases. For reference, a normal range of an impedance is 70 to 100 $m\Omega \cdot cm^2$.

1) In the case in which the impedance of the minimum voltage channel is a first threshold value (for example, 120 $m\Omega \cdot cm^2$) or more, the stack impedance is the first threshold value or more, and the driving condition is the normal driving, the controller 22 diagnoses that the state of the fuel cell stack 10 is a state in which a humidity amount is insufficient.

In this case corresponding to the case in which both of the impedance of the minimum voltage channel and the stack impedance are high, a resistance of an electrolyte membrane is increased due to insufficiency of moisture. Therefore, the controller 22 may provide measures for lowering all of a driving temperature, a flow rate of air, a pressure of an anode.

2) In the case in which the impedance of the minimum voltage channel is lower than that in the normal range, the impedance of the maximum voltage channel is in the normal range or is lower than that in the normal range, the impedance of the average voltage channel is in the normal range or is lower than that in the normal range, the impedance of the maximum voltage variation channel is lower than that in the normal range, the stack impedance is lower than that in the normal range, and the driving condition is the normal driving, the controller 22 diagnoses that the state of the fuel cell stack 10 is a state in which a humidity amount is excessive.

In this case corresponding to the case in which both of the impedance of the maximum voltage variation channel and the stack impedance are low, a voltage instability phenomenon occurs and a resistance of an electrolyte membrane is decreased, due to excessive moisture. Therefore, the controller 22 may provide measures for raising all of a driving temperature, a flow rate of air, a pressure of an anode.

3) In the case in which the impedance of the maximum voltage variation channel is lower than that in the normal range, the impedance of the minimum voltage variation channel is the first threshold value or more, the stack impedance is in the normal range, an impedance difference between one or more channels (the minimum voltage channel, the maximum voltage channel, the average voltage channel, the maximum voltage variation channel, and the minimum voltage variation channel) is a second threshold value (for example, 20 $m\Omega \cdot cm^2$) or more, and the driving condition is the normal driving, the controller 22 decides that the state of the fuel cell stack 10 is a mixed state.

In this case corresponding to the case in which the impedance difference between the channels is large, the impedance of the minimum voltage variation channel is high, and is the impedance of the maximum voltage variation channel is low, a state in which a humidity amount is insufficient and a state in which a humidity amount is excessive are mixed with each other, and an increase in a resistance of an electrolyte membrane due to insufficiency of the humidity amount causes large voltage loss, and the excess of the humidity amount causes a large voltage variation. Therefore, the controller 22 may provide measures for equalizing the state of the fuel cell stack 10 by repeatedly adjusting a driving temperature, a flow rate and a pressure of air, and a flow rate and a pressure of hydrogen, and the like, up and down.

4) In the case in which the impedance of the minimum voltage channel is a third threshold value (for example, 200 $m\Omega \cdot cm^2$) or more, the impedance of the maximum voltage channel is in the normal range, the stack impedance is in the normal range, an impedance of the channel of the start position of the fuel cell stack 10 (that is, a channel around fuel/coolant inlet) exceeds the normal range, and the driving condition is the normal driving, the controller 22 diagnoses that the state of the fuel cell stack 10 is a state in which foreign materials are introduced.

In this case corresponding to the case in which the impedance of the channel around the fuel or coolant inlet is large, the stack impedance is normal, and the impedance of the minimum voltage channel is very large in the distribution of the impedances, the controller 22 decides that the foreign materials are introduced through the fuel or coolant inlet, thereby making it possible to provide measures for executing a process for exhausting the foreign materials. As an example, in the case in which the foreign materials are introduced through the coolant inlet, the controller 22 lowers a driving temperature, and promotes water exhaust through high current driving.

2) In the case in which the impedance of the minimum voltage channel is the first threshold value or more, the impedance of the maximum voltage channel is in the normal range, the stack impedance exceeds the normal range, an impedance of the channel of the central position of the fuel cell stack 10 exceeds the normal range, and the driving condition is the normal driving, the controller 22 diagnoses that the state of the fuel cell stack 10 is a state in which a flow rate of coolant is insufficient.

In this case corresponding to the case in which the impedance of the channel of the central position of the fuel cell stack 10 is high in the distribution of the impedances, a resistance of an electrolyte membrane is increased due to the insufficiency of the flow rate of coolant. Therefore, the controller 22 may provide measures for lowering a driving temperature and raising the flow rate of coolant.

6) In the case in which the impedance of the minimum voltage channel is the third threshold value or more, the impedance of the average voltage channel is the third threshold value or more, the stack impedance is the third threshold value or more, the impedance of the channel of the start position of the fuel cell stack 10 is the third threshold value or more, an impedance of the channel of the final position of the fuel cell stack 10 is the third threshold value or more, and the driving condition is the low-temperature start-up, the controller 22 diagnoses that the state of the fuel cell stack 10 is a stack frozen state. Here, the impedance of the channel of the start position of the fuel cell stack 10 and the impedance of the channel of the final position of the fuel cell stack 10 mean impedances of channels disposed at both ends of the fuel cell stack 10.

In this case corresponding to the case in which the stack impedance and the impedance of the minimum voltage channel are high at the time of the low-temperature start-up, the controller 22 decides that an effective reaction area is decreased due to a frozen cell, thereby making it possible to provide measures for adjusting a low-temperature start-up protocol in order to prevent the fuel cell stack from being damaged. As an example, the controller 22 may provide measures for adjusting 50 A output low-temperature start-up to 20 A output low-temperature start-up.

Figure 6:
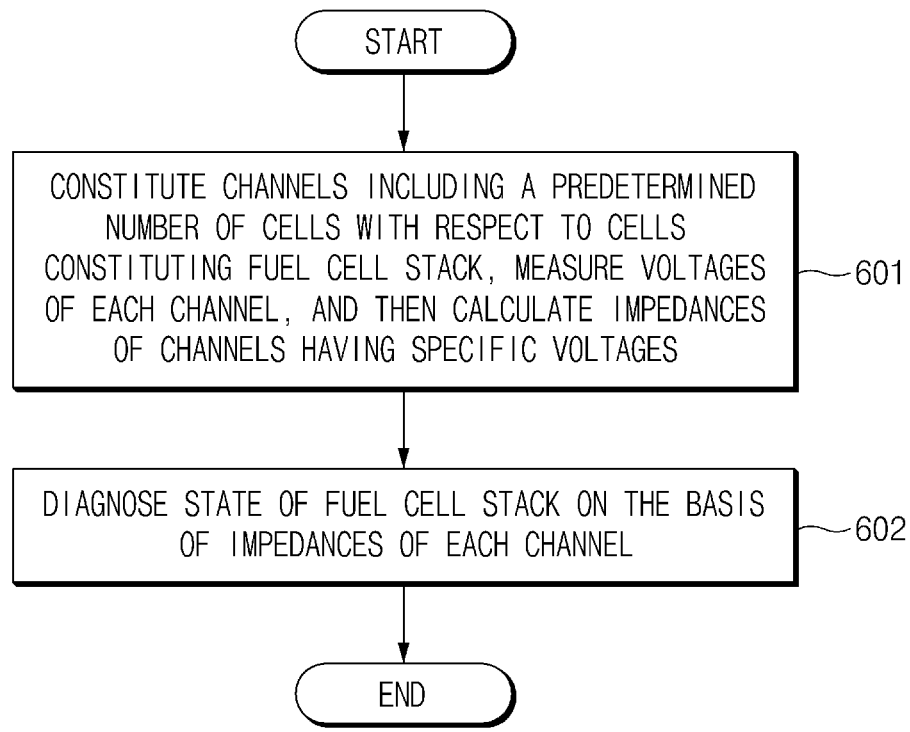
FIG. 6 is a flow chart illustrating a method for diagnosing a state of a fuel cell stack according to an exemplary embodiment of the present disclosure.

FIG. 6 is a flow chart illustrating a method for diagnosing a state of a fuel cell stack according to an exemplary embodiment of the present disclosure.

First, the SVM 21 constitutes the channels including the predetermined number of cells with respect to the cells constituting the fuel cell stack 10, measures the voltages of each channel, and then calculates the impedances of the channels having the specific voltages (601). In this case, the SVM 21 calculates each of the impedance of the minimum voltage channel, the impedance of the maximum voltage channel, the impedance of the average voltage channel, the impedance of the maximum voltage variation channel, the impedance of the minimum voltage variation channel, and the stack impedance. In addition, the SVM 21 estimates the distribution of the impedances of all the channels of the fuel cell stack on the basis of the distribution of the impedances of each channel calculated as described above.

Then, the controller 22 diagnoses the state of the fuel cell stack on the basis of the impedances of each channel calculated by the SVM 21 (602).

Here, the controller 22 diagnoses that the state of the fuel cell stack is the state in which the humidity amount is insufficient, when the impedance of the minimum voltage channel and the stack impedance are the first threshold value or more and the driving condition is the normal driving.

In addition, the controller 22 diagnoses that the state of the fuel cell stack 10 is the state in which the humidity amount is excessive, when the impedance of the minimum voltage channel, the impedance of the maximum voltage variation channel, and the stack impedance are lower than that in the normal range, the impedance of the maximum voltage channel is in the normal range or is lower than that in the normal range, the impedance of the average voltage channel is in the normal range or is lower than that in the normal range, and the driving condition is the normal driving.

In addition, the controller 22 diagnoses that the state of the fuel cell stack 10 is the mixed state, when the impedance of the maximum voltage variation channel is lower than that in the normal range, the impedance of the minimum voltage variation channel is the first threshold value or more, the stack impedance is in the normal range, the impedance difference between the respective channels is the second threshold value or more, and the driving condition is the normal driving.

In addition, the controller 22 diagnoses that the state of the fuel cell stack 10 is the state in which the foreign materials are introduced, when the impedance of the minimum voltage channel is the third threshold value or more, the impedance of the maximum voltage channel and the stack impedance are in the normal range, the impedance of the channel of the start position of the fuel cell stack 10 exceeds the normal range, and the driving condition is the normal driving.

In addition, the controller 22 diagnoses that the state of the fuel cell stack 10 is the state in which the flow rate of coolant is insufficient, when the impedance of the minimum voltage channel is the first threshold value or more, the impedance of the maximum voltage channel is in the normal range, the stack impedance and the impedance of the channel of the central position of the fuel cell stack 10 exceed the normal range, and the driving condition is the normal driving.

In addition, the controller 22 diagnoses that the state of the fuel cell stack 10 is the stack frozen state, when the impedance of the minimum voltage channel, the impedance of the average voltage channel, the stack impedance, and the impedances of the channels disposed at both ends of the fuel cell stack 10 are the third threshold value or more, and the driving condition is the low-temperature start-up.

Meanwhile, the method for diagnosing a state of a fuel cell stack according to an exemplary embodiment of the present disclosure as described above may be created by a computer program. In addition, codes and code segments constituting the computer program may be easily inferred by a computer programmer skilled in the related art. Further, the created computer program is stored in a computer-readable recording medium (information storing medium) and is read and executed by a computer to implement the method for diagnosing a state of a fuel cell stack according to an exemplary embodiment of the present disclosure. Further, the computer-readable recording medium includes all types of recording media that are readable by the computer.

As described above, according to the exemplary embodiment of the present disclosure, it is possible to detect whether or not abnormity is generated in a channel unit by constituting the channels including the predetermined number of cells with respect to the cells constituting the fuel cell stack, measuring the voltages of each channel, calculating the impedances of the channels having the specific voltages, and then diagnosing the state of the fuel cell stack on the basis of the calculated impedances.

Particularly, according to the exemplary embodiment of the present disclosure, it is possible to detect a cell into which foreign materials are introduced, a frozen cell, a cell having an insufficient humidity amount, a cell having an excessive humidity amount, and the like, and diagnose a mixed state in which a cell having an insufficient humidity amount and a cell having an excessive humidity amount coexist with each other by constituting the channels including the predetermined number of cells with respect to the cells constituting the fuel cell stack, measuring the voltages of each channel, calculating the impedances of the channels having the specific voltages, and then diagnosing the state of the fuel cell stack on the basis of the calculated impedances.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus comprising:
   a stack voltage monitor (SVM) configured to
      measure a voltage of each channel of a plurality of channels of a fuel cell stack, each channel of the plurality of channels including a predetermined number of unit cells, and
      calculate impedances of a subset of the plurality of channels having voltages affecting diagnosis of the fuel cell stack; and
   a controller configured to diagnose a state of the fuel cell stack based on the calculated impedances, wherein the SVM is configured to estimate a distribution of impedances of all the channels of the fuel cell stack based on a distribution of the calculated impedances of the subset of the plurality of channels.

2. The apparatus according to claim 1, wherein the SVM is configured to calculate one or more of
an impedance of a minimum voltage channel from amongst the plurality of channels,
an impedance of a maximum voltage channel from amongst the plurality of channels,
an impedance of an average voltage channel from amongst the plurality of channels,
an impedance of a maximum voltage variation channel from amongst the plurality of channels,
an impedance of a minimum voltage variation channel from amongst the plurality of channels, and
a stack impedance.

3. The apparatus according to claim 1, wherein the controller is configured to diagnose the state of the fuel cell stack based on
an impedance of a minimum voltage channel from amongst the plurality of channels,
an impedance of a maximum voltage channel from amongst the plurality of channels,
an impedance of an average voltage channel from amongst the plurality of channels,
an impedance of a maximum voltage variation channel from amongst the plurality of channels,
an impedance of a minimum voltage variation channel from amongst the plurality of channels,
a stack impedance,
a distribution of the impedances of all the channels of the fuel cell stack, and
a driving condition.

4. The apparatus according to claim 3, wherein the controller is configured to diagnose that the state of the fuel cell stack is a state in which a humidity amount is insufficient,
when the impedance of the minimum voltage channel and the stack impedance are a first threshold value or more, and
when the driving condition is normal driving.

5. The apparatus according to claim 3, wherein the controller is configured to diagnose that the state of the fuel cell stack is a state in which a humidity amount is excessive,
when the impedance of the minimum voltage channel, the impedance of the maximum voltage variation channel, and the stack impedance are lower than that in a normal range,
when the impedance of the maximum voltage channel is in the normal range or is lower than that in the normal range,
when the impedance of the average voltage channel is in the normal range or is lower than that in the normal range, and
when the driving condition is normal driving.

6. The apparatus according to claim 3, wherein the controller is configured to diagnose that the state of the fuel cell stack is a mixed state,
when the impedance of the maximum voltage variation channel is lower than that in a normal range,
when the impedance of the minimum voltage variation channel is a first threshold value or more,
when the stack impedance is in the normal range,
when an impedance difference between the respective channels is a second threshold value or more, and
when the driving condition is normal driving.

7. The apparatus according to claim 3, wherein the controller is configured to diagnose that the state of the fuel cell stack is a state in which foreign materials are introduced, when the impedance of the minimum voltage channel is a third threshold value or more,
when the impedance of the maximum voltage channel and the stack impedance are in a normal range,
when an impedance of a channel of a start position of the fuel cell stack exceeds the normal range, and
when the driving condition is normal driving.

8. The apparatus according to claim 3, wherein the controller is configured to diagnose that the state of the fuel cell stack is a state in which a flow rate of coolant is insufficient,
when the impedance of the minimum voltage channel is a first threshold value or more,
when the impedance of the maximum voltage channel is in a normal range,
when the stack impedance and an impedance of a channel of a central position of the fuel cell stack exceed the normal range, and
when the driving condition is normal driving.

9. The apparatus according to claim 3, wherein the controller is configured to diagnose that the state of the fuel cell stack is a stack frozen state,
when the impedance of the minimum voltage channel, the impedance of the average voltage channel, the stack impedance, and impedances of channels disposed at both ends of the fuel cell stack are a third threshold value or more, and
when the driving condition is low-temperature start-up.

10. A method for diagnosing a state of a fuel cell stack, the method comprising:
measuring a voltage for each channel of a plurality of channels of a fuel cell stack, each channel of the plurality of channels including a predetermined number of unit cells;
calculating impedances of a subset of the plurality of channels having voltages affecting diagnosis of the fuel cell stack; and
at a controller, diagnosing the state of the fuel cell stack based on the calculated impedances, wherein calculating the impedances comprises:
estimating a distribution of impedances of all the channels of the fuel cell stack based on a distribution of the calculated impedances of the subset of the plurality of channels.

11. The method according to claim 10, wherein calculating the impedances comprises:
calculating an impedance of a minimum voltage channel from amongst the plurality of channels,
calculating an impedance of a maximum voltage channel from amongst the plurality of channels,
calculating an impedance of an average voltage channel from amongst the plurality of channels,
calculating an impedance of a maximum voltage variation channel from amongst the plurality of channels,
calculating an impedance of a minimum voltage variation channel from amongst the plurality of channels, and
calculating a stack impedance.

12. The method according to claim 11, wherein the diagnosing comprises: diagnosing the state of the fuel cell stack based on the impedance of the minimum voltage channel, the impedance of the maximum voltage channel, the impedance of the average voltage channel, the impedance of the maximum voltage variation channel, the impedance of the minimum voltage variation channel, the stack impedance, the distribution of the impedances of all the channels of the fuel cell stack, and a driving condition.

13. The method according to claim 12, wherein the diagnosing comprises:
diagnosing that the state of the fuel cell stack is a state in which a humidity amount is insufficient,
when the impedance of the minimum voltage channel and the stack impedance are a first threshold value or more, and
when the driving condition is normal driving.

14. The method according to claim 12, wherein the diagnosing comprises:
diagnosing that the state of the fuel cell stack is a state in which a humidity amount is excessive,
when the impedance of the minimum voltage channel, the impedance of the maximum voltage variation channel, and the stack impedance are lower than that in a normal range,
when the impedance of the maximum voltage channel is in the normal range or is lower than that in the normal range,
when the impedance of the average voltage channel is in the normal range or is lower than that in the normal range, and
when the driving condition is normal driving.

15. The method according to claim 12, wherein the diagnosing comprises:
diagnosing that the state of the fuel cell stack is a mixed state,
when the impedance of the maximum voltage variation channel is lower than that in a normal range,
when the impedance of the minimum voltage variation channel is a first threshold value or more,
when the stack impedance is in the normal range,
when an impedance difference between the respective channels is a second threshold value or more, and
when the driving condition is normal driving.

16. The method according to claim 12, wherein the diagnosing comprises:
diagnosing that the state of the fuel cell stack is a state in which foreign materials are introduced,
when the impedance of the minimum voltage channel is a third threshold value or more,
when the impedance of the maximum voltage channel and the stack impedance are in a normal range,
when an impedance of a channel of a start position of the fuel cell stack exceeds the normal range, and
when the driving condition is normal driving.

17. The method according to claim 12, wherein the diagnosing comprises:
diagnosing that the state of the fuel cell stack is a state in which a flow rate of coolant is insufficient,
when the impedance of the minimum voltage channel is a first threshold value or more,
when the impedance of the maximum voltage channel is in a normal range,
when the stack impedance and an impedance of a channel of a central position of the fuel cell stack exceed the normal range, and
when the driving condition is normal driving.

18. The method according to claim 12, wherein the diagnosing comprises:
diagnosing that the state of the fuel cell stack is a stack frozen state,
when the impedance of the minimum voltage channel, the impedance of the average voltage channel, the stack impedance, and impedances of channels disposed at both ends of the fuel cell stack are a third threshold value or more, and
when the driving condition is low-temperature start-up.

* * * * *